US008482599B2

(12) United States Patent
Yamaya et al.

(10) Patent No.: US 8,482,599 B2
(45) Date of Patent: Jul. 9, 2013

(54) 3D MODELING APPARATUS, 3D MODELING METHOD, AND COMPUTER READABLE MEDIUM

(75) Inventors: Takashi Yamaya, Fussa (JP); Keiichi Sakurai, Akishima (JP); Mitsuyasu Nakajima, Tokyo (JP); Yuki Yoshihama, Inagi (JP)

(73) Assignee: Casio Computer Co., Ltd., Tokyo (JP)

( * ) Notice: Subject to any disclaimer, the term of this patent is extended or adjusted under 35 U.S.C. 154(b) by 336 days.

(21) Appl. No.: 13/073,155

(22) Filed: Mar. 28, 2011

(65) Prior Publication Data
US 2011/0234759 A1 Sep. 29, 2011

(30) Foreign Application Priority Data
Mar. 29, 2010 (JP) ................. P2010-074486

(51) Int. Cl.
*H04N 13/02* (2006.01)
*H04N 13/00* (2006.01)
*H04N 13/04* (2006.01)

(52) U.S. Cl.
USPC .................... 348/46; 348/42; 348/43; 348/51

(58) Field of Classification Search
USPC .......................................................... 348/43
See application file for complete search history.

(56) References Cited

U.S. PATENT DOCUMENTS
6,405,151 B1 6/2002 Fujii et al.
6,580,821 B1 * 6/2003 Roy ............................. 382/154
2003/0043152 A1 3/2003 Raskar 2003/0044073 A1* 3/2003 Matsugu et al. ............. 382/195
2005/0083248 A1* 4/2005 Biocca et al. .................. 345/8
2005/0147297 A1 7/2005 McLaughlin et al.
(Continued)

FOREIGN PATENT DOCUMENTS
JP 05303629 * 11/1993
JP 2953154 B2 7/1999
JP 2000-113193 A 4/2000

OTHER PUBLICATIONS

Digital Image Processing, CG-ARTS Society, published on Mar. 1, 2006; pp. 252-262.

(Continued)

*Primary Examiner* — Joseph Ustaris
*Assistant Examiner* — Zhubing Ren
(74) *Attorney, Agent, or Firm* — Holtz, Holtz, Goodman & Chick, P.C.

(57) ABSTRACT

A 3D modeling apparatus includes: a generator configured to generate 3D models of a subject based on pairs of images; a selector configured to select a first 3D model and a second 3D model from the 3D models, wherein the second 3D model is to be superimposed on the first 3D model; an extracting unit configured to extract first feature points from the first 3D model and extract second feature points from the second 3D model; an acquiring unit configured to acquire coordinate transformation parameters based on the first and second feature points; a transformation unit configured to transform coordinates of the second 3D model into coordinates in a coordinate system of the first 3D model, based on the coordinate transformation parameters; and a combining unit configured to superimpose the second 3D model having the transformed coordinates on the first 3D model.

7 Claims, 8 Drawing Sheets

U.S. PATENT DOCUMENTS

| | | | |
|---|---|---|---|
| 2007/0064098 A1* | 3/2007 | Tran | 348/43 |
| 2009/0096790 A1* | 4/2009 | Wiedemann et al. | 345/427 |
| 2010/0054579 A1* | 3/2010 | Okutomi et al. | 382/154 |
| 2010/0098324 A1* | 4/2010 | Fujieda | 382/154 |
| 2010/0098327 A1 | 4/2010 | Se et al. | |
| 2011/0227924 A1 | 9/2011 | Nakajima et al. | |

OTHER PUBLICATIONS

U.S. Appl. No. 13/049,184; Title: "3D Modeling Apparatus, 3D Modeling Method, and Computer Readable Medium"; filed Mar. 16, 2011; First Named Inventor: Mitsuyasu Nakajima.

* cited by examiner

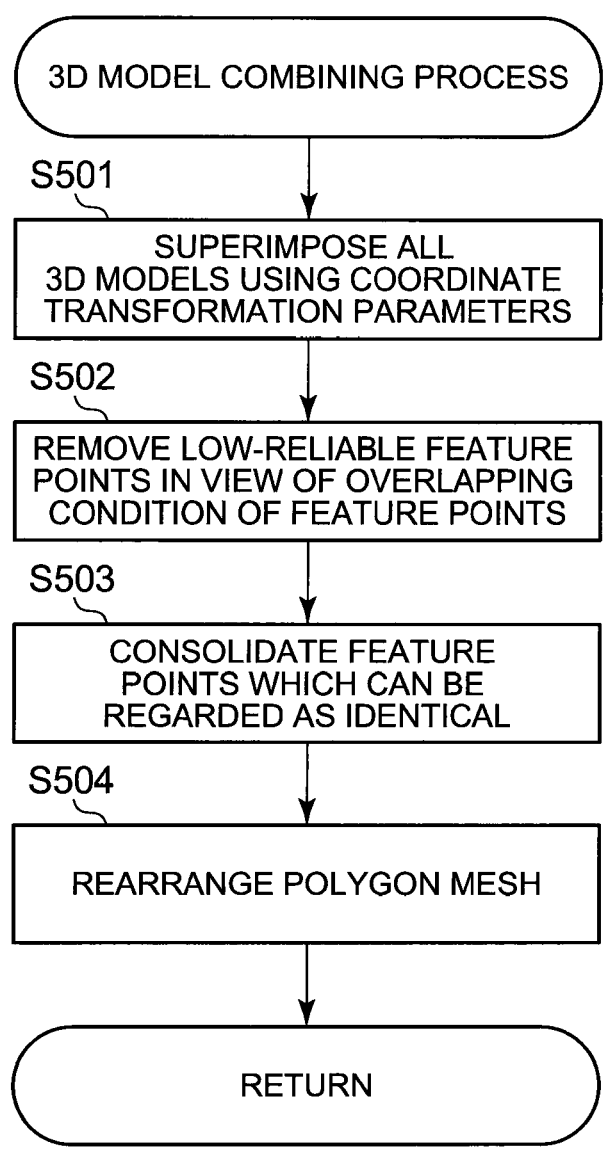

3D MODELING APPARATUS, 3D MODELING METHOD, AND COMPUTER READABLE MEDIUM

CROSS-REFERENCE TO RELATED APPLICATION

This application claims priority from Japanese Patent Application No. 2010-074486, filed on Mar. 29, 2010, the entire contents of which are hereby incorporated by reference.

BACKGROUND

1. Technical Field

The present disclosure relates to a 3D modeling apparatus, a 3D modeling method, and a computer readable medium.

2. Related Art

There has been known a technique for generating a 3D model of a subject such as a human, an animal or an art object. According to the technique, images of the subject are taken by use of a stereo camera with a right-eye image capturing unit and a left-eye image capturing unit, and a 3D model of the subject is generated based on a right-eye image and a left-eye image obtained thus.

Specifically, stereo matching is applied to the right-eye image and the left-eye image to obtain a corresponding point expressing one and the same point on the subject. Next, based on the obtained corresponding point and a distance between the right-eye image capturing unit and the left-eye image capturing unit, a distance (depth) between the stereo camera and the corresponding point is obtained by the knack of triangulation. 3D coordinates of the corresponding point are obtained from the obtained distance, and a 3D model of the subject is further constructed.

However, when 3D modeling is performed based on a right-eye image and a left-eye image obtained by imaging concurrently from positions close to each other, it is impossible to attain 3D modeling with satisfactory accuracy. There has been therefore a demand for a technique for implementing 3D modeling with satisfactory accuracy.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Accordingly, it is an illustrative aspect of the present invention to provide a 3D modeling apparatus and a 3D modeling method and a computer readable medium causing a computer to perform a 3D modeling on a subject.

According to one or more illustrative aspects of the present invention, there is provided a 3D modeling apparatus. The apparatus includes: an accepting unit configured to accept a plurality of pairs of images that are obtained by capturing a subject at different angles using a stereo camera; a generator configured to generate a plurality of 3D models of the subject based on the pairs of images, wherein each of the 3D models corresponds to one of the pairs of images; a selector configured to select a first 3D model and a second 3D model from the plurality of 3D models, wherein the second 3D model is to be superimposed on the first 3D model; an extracting unit configured to extract a plurality of first feature points from the first 3D model and extract a plurality of second feature points from the second 3D model; an acquiring unit configured to acquire coordinate transformation parameters for transforming coordinates of the second 3D model into coordinates in a coordinate system of the first 3D model, based on the first and second feature points; a transformation unit configured to transform the coordinates of the second 3D model into coordinates in the coordinate system of the first 3D model, based on the coordinate transformation parameters; and a combining unit configured to superimpose the second 3D model having the transformed coordinates on the first 3D model.

According to one or more illustrative aspects of the present invention, there is provided a 3D modeling method. The method includes: (a) capturing a subject at different angles using a stereo camera so as to obtain a plurality of pairs of images; (b) generating a plurality of 3D models of the subject based on the pairs of images, wherein each of the 3D models corresponds to one of the pairs of images; (c) selecting a first 3D model and a second 3D model from the plurality of 3D models, wherein the second 3D model is to be superimposed on the first 3D model; (d) extracting a plurality of first feature points from the first 3D model; (e) extracting a plurality of second feature points from the second 3D model; (f) acquiring coordinate transformation parameters for transforming coordinates of the second 3D model into coordinates in a coordinate system of the first 3D model, based on the first and second feature points; (g) transforming the coordinates of the second 3D model into coordinates in the coordinate system of the first 3D model, based on the coordinate transformation parameters; and (h) superimposing the second 3D model having the transformed coordinates on the first 3D model.

According to one or more illustrative aspects of the present invention, there is provided a computer-readable medium storing a program for causing the computer to perform following operations including: (a) capturing a subject at different angles using a stereo camera so as to obtain a plurality of pairs of images; (b) generating a plurality of 3D models of the subject based on the pairs of images, wherein each of the 3D models corresponds to one of the pairs of images; (c) selecting a first 3D model and a second 3D model from the plurality of 3D models, wherein the second 3D model is to be superimposed on the first 3D model; (d) extracting a plurality of first feature points from the first 3D model; (e) extracting a plurality of second feature points from the second 3D model; (f) acquiring coordinate transformation parameters for transforming coordinates of the second 3D model into coordinates in a coordinate system of the first 3D model, based on the first and second feature points; (g) transforming the coordinates of the second 3D model into coordinates in the coordinate system of the first 3D model, based on the coordinate transformation parameters; and (h) superimposing the second 3D model having the transformed coordinates on the first 3D model.

Other aspects and advantages of the present invention will be apparent from the following description, the drawings and the claims.

BRIEF DESCRIPTION OF THE DRAWINGS

Exemplary embodiments of the present invention will be described in detail based on the following figures, wherein:

FIG. 8 is a flow chart showing a 3D model combining process shown in FIG. 4.

DETAILED DESCRIPTION OF EXEMPLARY EMBODIMENTS

A 3D modeling apparatus according to an embodiment of the invention will be described below with reference to the drawings.

(Embodiment)

This embodiment will be described along an example in which the invention is applied to a digital stereo camera. In this embodiment, the stereo camera executes a process for taking images of a subject and a process for combining 3D models of the subject repeatedly from when a shutter button is pressed till when the shutter button is released. First, the external appearance of a stereo camera 1000 according to the embodiment of the invention will be described with reference to FIGS. 1A and 1B.

Figure 1A:
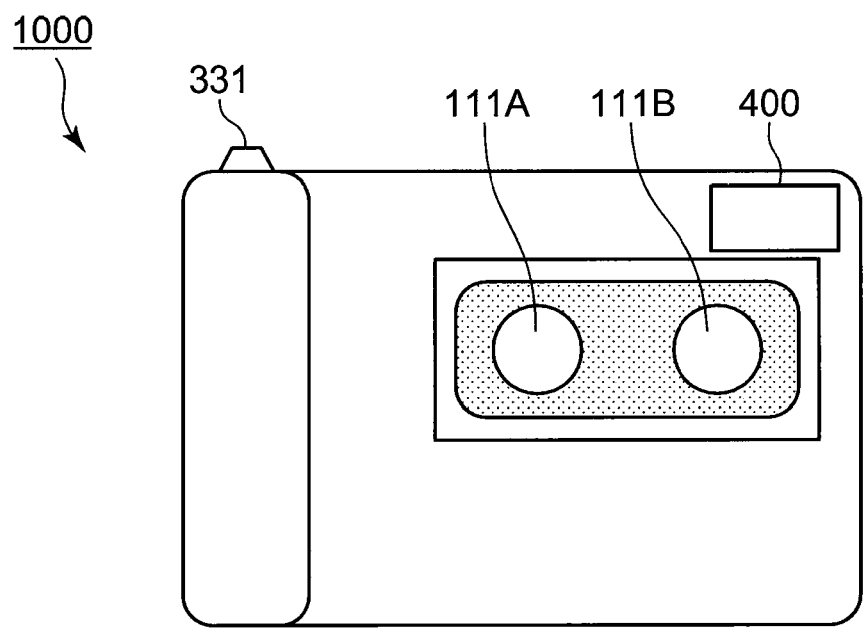
FIG. 1A is an external views showing the appearance of a front surface of a stereo camera according to an embodiment of the invention.
Figure 1B:
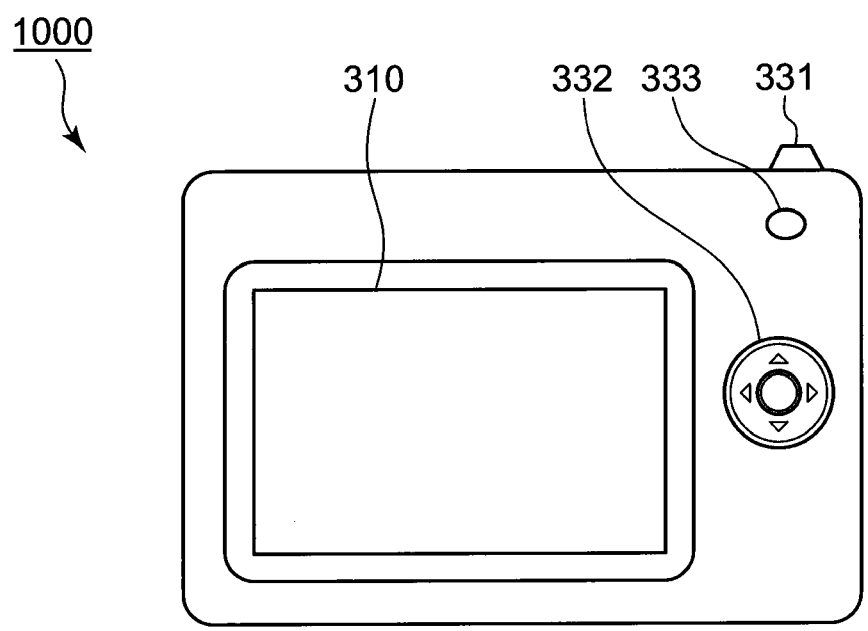
FIG. 1B is an external view showing the appearance of a back surface of the stereo camera according to the embodiment of the invention.

As shown in FIG. 1A, a lens 111A, a lens 111B and a stroboscopic light emission unit 400 are provided in a front surface of the stereo camera 1000. In addition, as shown in FIG. 1A, a shutter button 331 is provided in a top surface of the stereo camera 1000. Further, as shown in FIG. 1B, a display unit 310, an operation button 332 and a power button 333 are provided in a back surface of the stereo camera 1000.

The lens 111A and the lens 111B are provided at a predetermined distance from each other and in parallel to each other.

The display unit 310 is constituted by an LCD (Liquid Crystal Display) serving as a power button, an operation button and an electronic view finder.

The shutter button 331 is a button which should be pressed continuously when images of a subject are being taken. That is, the stereo camera 1000 takes images of the subject repeatedly as long as the shutter button 331 is pressed.

The operation button 332 accepts various operations from a user. The operation button 332 includes a cross key and an enter key for use in operation for mode switching, display switching, or the like.

The power button 333 is a key which should be pressed for powering on/off the stereo camera 1000.

The stroboscopic light emission unit 400 irradiates the subject with stroboscopic light. The configuration of the stroboscopic light emission unit 400 will be described later.

Here, the electric configuration of the stereo camera 1000 will be described with reference to FIG. 2.

Figure 2:
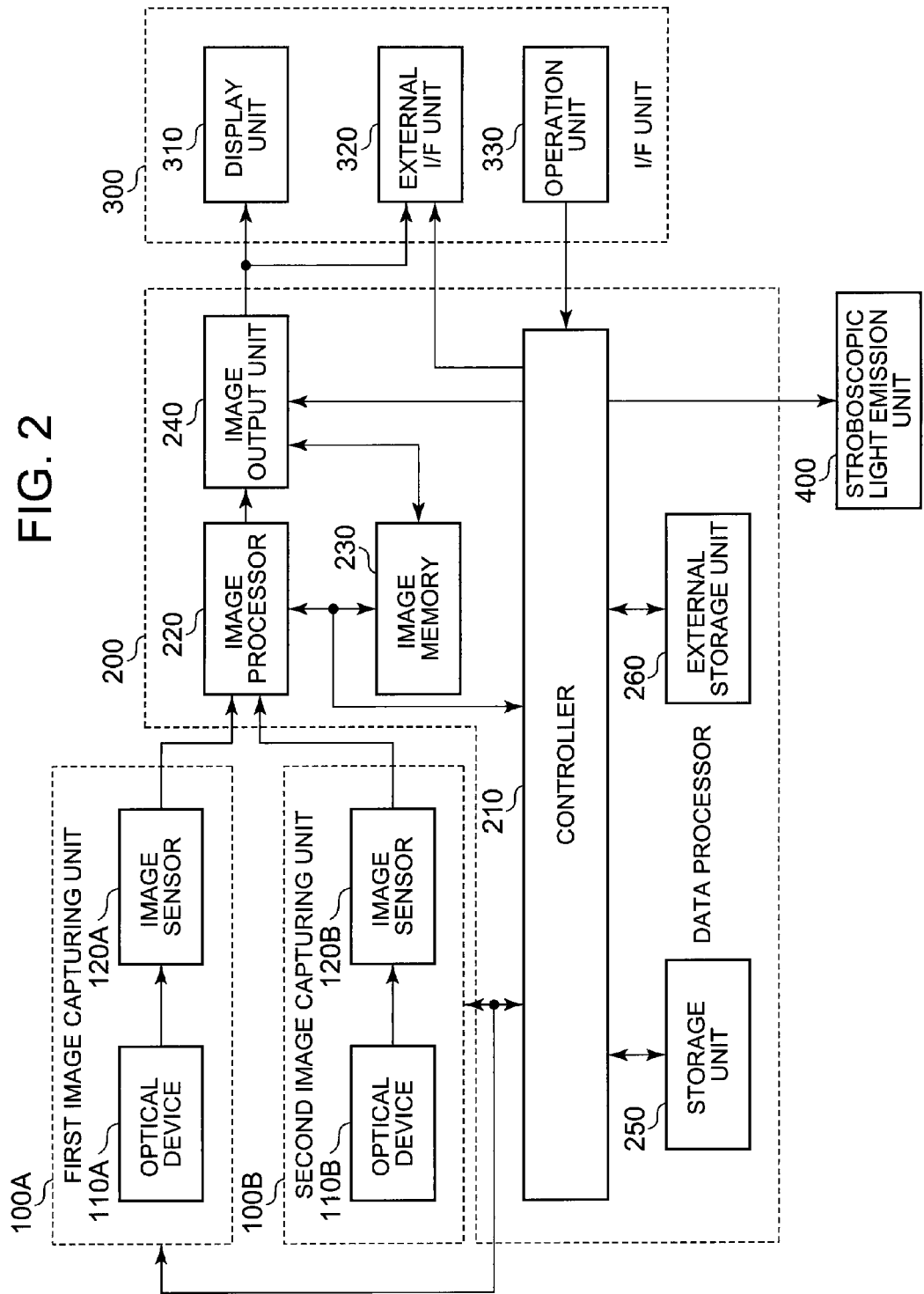
FIG. 2 is a block diagram showing the configuration of the stereo camera according to the embodiment of the invention.

As shown in FIG. 2, the stereo camera 1000 is provided with a first image capturing unit 100A, a second image capturing unit 100B, a data processor 200, an interface 300 and the stroboscopic light emission unit 400. In FIG. 2, the interface unit is notated as an I/F unit appropriately.

The first image capturing unit 100A and the second image capturing unit 100B are portions for imaging the subject. The stereo camera 1000 is configured to have two image capturing units, that is, the first image capturing unit 100A and the second image capturing unit 100B in order to serve as a stereo camera. The first image capturing unit 100A and the second image capturing unit 100B have one and the same configuration. Each constituent part of the first image capturing unit 100A is referred to by a numeral with a suffix "A", while each constituent part of the second image capturing unit 100B is referred to by a numeral with a suffix "B".

As shown in FIG. 2, the first image capturing unit 100A is provided with an optical device 110A and an image sensor 120A, while the second image capturing unit 100B is provided with an optical device 110B and an image sensor 120B. The optical device 110B has the same configuration as the optical device 110A, and the image sensor 120B has the same configuration as the image sensor 120A. Therefore, description will be made below only on the configurations of the optical device 110A and the image sensor 120A.

The optical device 110A, for example, includes the lens 111A, a diaphragm mechanism, a shutter mechanism, etc. and performs optical operation concerned with imaging. That is, the optical device 110A operates to collect incident light while adjusting optical elements relating to angle of view, focusing, exposure, etc., such as focal length, aperture, shutter speed, and so on. The shutter mechanism included in the optical device 110A is a so-called mechanical shutter. When shutter operation is achieved only by the operation of the image sensor 120A, the shutter mechanism does not have to be included in the optical device 110A. The optical device 110A operates under the control of a controller 210 which will be described later.

The image sensor 120A generates an electric signal in accordance with the incident light collected by the optical device 110A. For example, the image sensor 120A includes an image sensor such as a CCD (Charge Coupled Device) or a CMOS (Complementally Metal Oxide Semiconductor). The image sensor 120A performs photoelectric conversion to generate an electric signal in accordance with the received light, and supplies the electric signal to the data processor 200.

As described above, the first image capturing unit 100A and the second image capturing unit 100B have the same configuration. Accordingly, the first image capturing unit 100A and the second image capturing unit 100B have thoroughly the same specifications including lens' focal length f, lens' F-number, aperture mechanism's aperture range, image sensor's size, image sensor's pixel number, layout, pixel area, etc.

In the stereo camera 1000 having the first image capturing unit 100A and the second image capturing unit 100B configured thus, the lens 111A built in the optical device 110A and the lens 111B built in the optical device 110B are configured to be formed on one and the same plane in the outer surface of the stereo camera 1000 as shown in FIG. 1A. Here, assume that the two lenses (light receiving portions) are placed so that their centers are located on one and the same line extending horizontally when the stereo camera 1000 is placed horizontally so that the shutter button 331 is located at the top of the stereo camera 1000. That is, when the first image capturing unit 100A and the second image capturing unit 100B are operated concurrently, two images (hereinafter referred to as "paired images" accordingly) of one and the same subject are taken, but the optical axis positions of the images are laterally shifted from each other. The stereo camera 1000 has a configuration as a so-called parallel stereo camera.

The data processor 200 processes electric signals generated by the imaging operation of the first image capturing unit 100A and the second image capturing unit 100B, so as to generate digital data indicating the taken images of the subject and perform image processing or the like on the images. As shown in FIG. 2, the data processor 200 is constituted by a controller 210, an image processor 220, an image memory 230, an image output unit 240, a storage unit 250, an external storage unit 260, etc.

The controller 210 is, for example, constituted by a processor such as a CPU (Central Processing Unit), a main storage unit (memory) such as a RAM (Random Access Memory), etc. The controller 210 executes programs stored in the storage unit 250, which will be described later, or the like, so as to control each portion of the stereo camera 1000.

The image processor 220 is, for example, constituted by an ADC (Analog-Digital Converter), a buffer memory, an image processing processor (so-called image processing engine), etc. The image processor 220 generates digital data (hereinafter referred to as "image data" accordingly) indicating the taken images of the subject based on the electric signals generated by the image sensors 120A and 120B.

That is, the ADC converts the analog electric signals supplied from the image sensor 120A and the image sensor 120B into digital signals, and stores the digital signals into the buffer memory sequentially. On the other hand, the image processor 220 performs a so-called development process or the like on the buffered digital data so as to perform image quality adjustment, data compression, etc.

The image memory 230 is, for example, constituted by a storage unit such as an RAM or a flash memory. The image memory 230 temporarily stores image data generated by the image processor 220, image data to be processed by the controller 210, and so on.

The image output unit 240 is, for example, constituted by an RGB signal generating circuit or the like. The image output unit 240 converts image data stored on the image memory 230 into RGB signals and supplies the RGB signals to a display screen (for example, the display unit 310 which will be described later).

The storage unit 250 is, for example, constituted by a storage unit such as a ROM (Read Only Memory) or a flash memory. The storage unit 250 stores programs, data, etc. required for the operation of the stereo camera 1000. In this embodiment, assume that operation programs executed by the controller 210 and so on, and parameters, operational expressions, etc. required for each processing are stored in the storage unit 250.

The external storage unit 260 is, for example, constituted by a storage unit removably attached to the stereo camera 1000, such as a memory card. The external storage unit 260 stores image data taken by the stereo camera 1000, data expressing a 3D model, etc.

The interface unit 300 has a configuration relating to an interface between the stereo camera 1000 and a user thereof or an external device. As shown in FIG. 2, the interface unit 300 is constituted by the display unit 310, an external interface unit 320, an operation unit 330, etc.

The display unit 310 is, for example, constituted by a liquid crystal display unit or the like. The display unit 310 displays various screens required for operating the stereo camera 1000, a live view image provided for photographing, a taken image of a subject, etc. In this embodiment, a taken image of a subject, a 3D model, etc. are displayed based on image signals (RGB signals) or the like supplied from the image output unit 240.

The external interface unit 320 is, for example, constituted by a USB (Universal Serial Bus) connector, a video output terminal, etc. The external interface unit 320 supplies image data etc. to an external computer apparatus or an external monitor unit.

The operation unit 330 is constituted by various buttons etc. built on the outer surface of the stereo camera 1000. The operation unit 330 generates an input signal in accordance with a user's operation on the stereo camera 1000, and supplies the input signal to the controller 210. For example, assume that the operation unit 330 includes the shutter button 331 for giving an instruction of shutter operation, the operation button 332 for specifying an operation mode etc. of the stereo camera 1000 or setting various functions, and the power button 333.

The stroboscopic light emission unit 400 is, for example, constituted by a xenon lamp (xenon flash). The stroboscopic light emission unit 400 irradiates the subject with flash under the control of the controller 210.

The stereo camera 1000 does not have to have the whole configuration shown in FIG. 2, but may have another configuration than the configuration shown in FIG. 2.

Here, of the operations of the stereo camera 1000, an operation relating to 3D modeling will be described with reference to FIG. 3.

Figure 3:
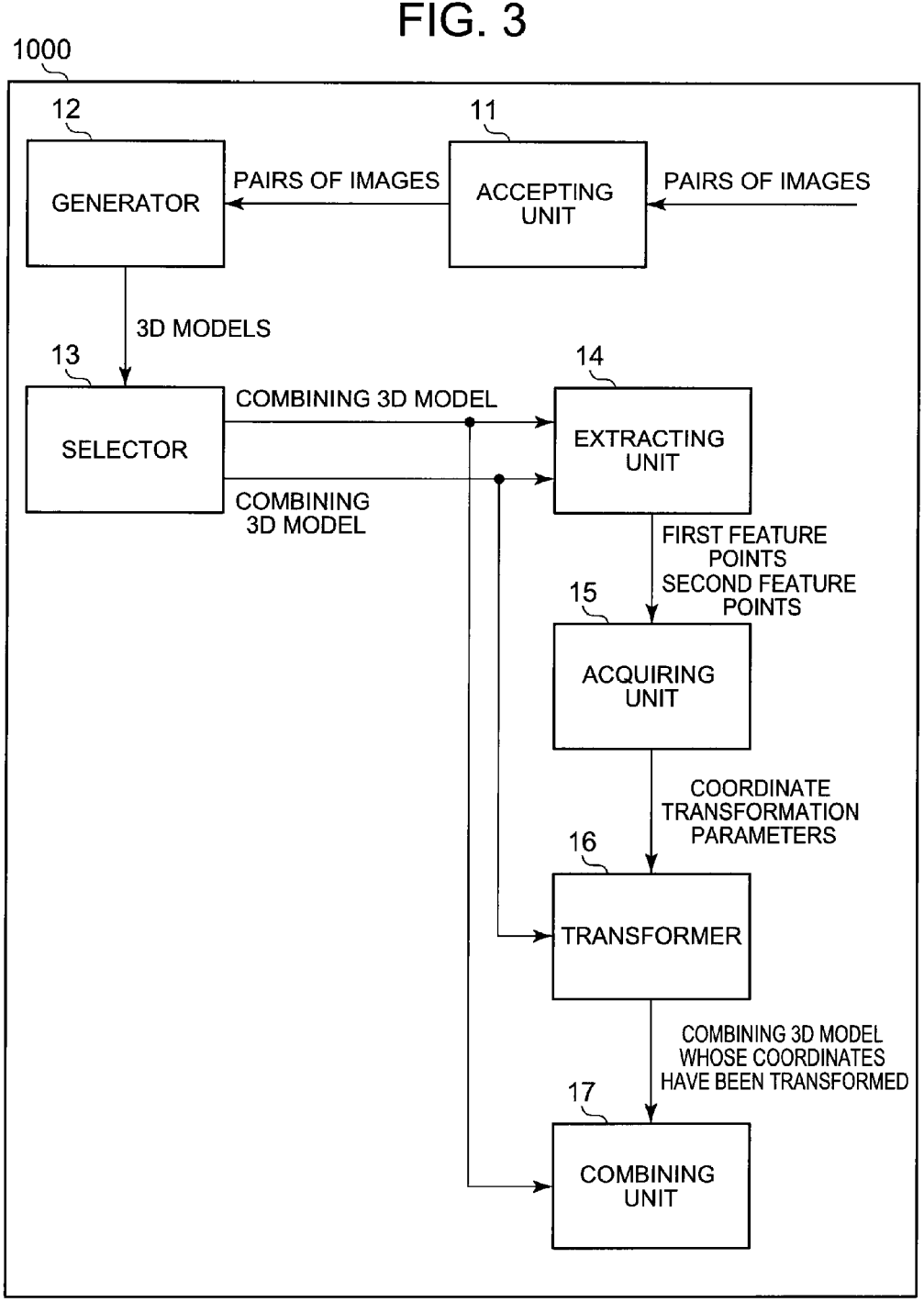
FIG. 3 is a block diagram showing the configuration of a main portion of the stereo camera according to the embodiment of the invention.

FIG. 3 is a block diagram showing a configuration of a main portion of the stereo camera 1000, that is, a configuration for implementing the operation relating to 3D modeling.

As shown in FIG. 3, the stereo camera 1000 has an accepting unit 11, a generator 12, a selector 13, an extracting unit 14, an acquiring unit 15, a transformer 16 and a combining unit 17. These portions are, for example, constituted by the controller 210.

The accepting unit 11 accepts an input of a plurality of pairs of images obtained by imaging a subject at different angles in a plurality of shots by use of the stereo camera 1000 which can acquire a pair of images in every shot.

The generator 12 generates a plurality of 3D models of the subject based on the accepted pairs of images, respectively.

The selector 13 selects, from the generated 3D models, a combined 3D model and a combining 3D model which will be combined with the combined 3D model.

The extracting unit 14 extracts a plurality of first feature points from the selected combined 3D model, and extracts a plurality of second feature points from the selected combining 3D model.

Based on the extracted first feature points and the extracted second feature points, the acquiring unit 15 transforms the coordinates of the combining 3D model into coordinates in the coordinate system of the combined 3D model.

Using coordinate transformation parameters acquired thus, the transformer 16 transforms the coordinates of the combining 3D model into coordinates in the coordinate system of the combined 3D model.

The combining unit 17 combines the transformed combining 3D model with the combined 3D model.

Figure 4:
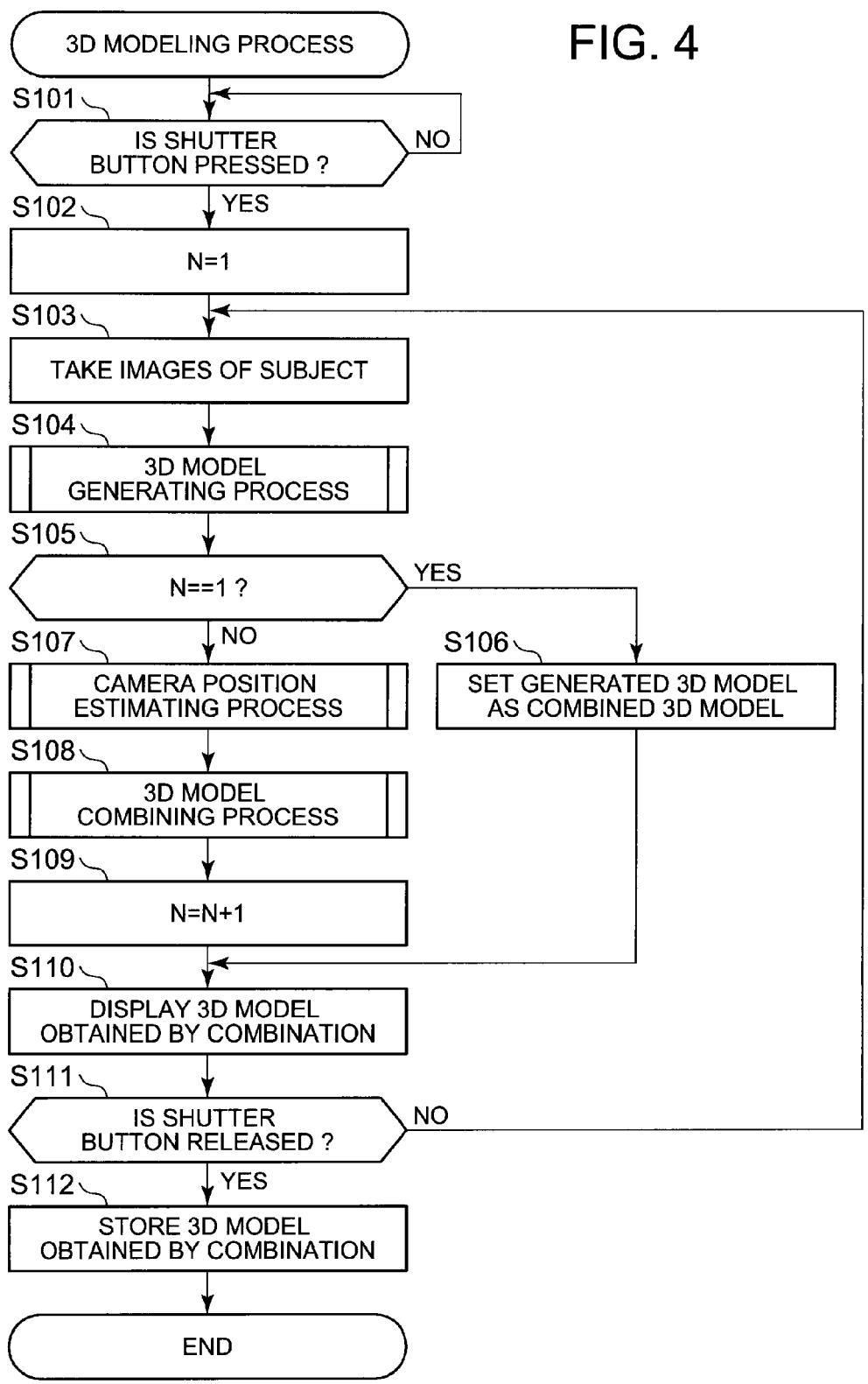
FIG. 4 is a flow chart showing a 3D modeling process executed by the stereo camera according to the embodiment of the invention.

Next, a 3D modeling process executed by the stereo camera 1000 will be described with reference to the flow chart shown in FIG. 4. When the operation mode of the stereo camera 1000 is set as a 3D modeling mode by the operation of the operation button 332 or the like, the stereo camera 1000 executes the 3D modeling process shown in FIG. 4.

In this embodiment, taking images of a subject, generating 3D models, combining the generated 3D models, displaying a preview of a 3D model obtained by combination, and so on, are performed repeatedly while the shutter button 331 is being pressed. Here, a 3D model obtained in the first shot to serve as a base of combination is referred to as "combined 3D model". On the other hand, a 3D model obtained in the second shot or any shot following the second shot to be combined with the combined 3D model is referred to as "combining 3D model". In the 3D modeling process, a 3D model obtained by combining 3D models a number of times corresponding to the number of shots is generated sequentially. Assume that the angle with which the subject is imaged differs from one shot to another.

First, the controller 210 determines whether the shutter button 331 is pressed or not (Step S101). When concluding that the shutter button 331 is not pressed (NO in Step S101), the controller 210 executes the processing of Step S101 again. On the other hand, when concluding that the shutter button 331 is pressed (YES in Step S101), the controller 210 initializes a shot number counter N to 1 (Step S102). The shot number counter N is, for example, stored in the storage unit 250.

When finishing the processing of Step S102, the controller 210 takes images of a subject 501 (Step S103). When the controller 210 takes images of the subject, two parallel coordinate images (paired images) are obtained. The obtained paired images are, for example, stored in the image memory 230. Of the paired images, an image obtained by imaging with the first image capturing unit 100A will be referred to as "image A", and an image obtained by imaging with the second image capturing unit 100B will be referred to as "image B".

When finishing the processing of Step S103, the controller 210 executes a 3D model generating process based on the paired images stored in the image memory 230 (Step S104).

Figure 5:
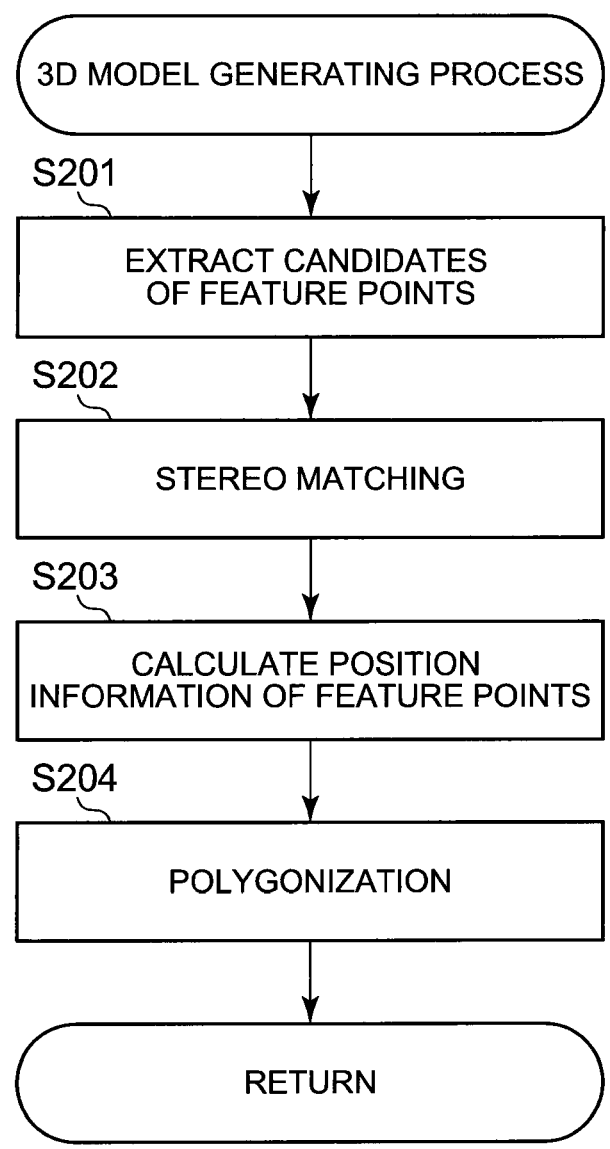
FIG. 5 is a flow chart showing a 3D model generating process shown in FIG. 4.

Here, the 3D model generating process will be described with reference to the flow chart shown in FIG. 5. The 3D model generating process is a process for generating a 3D model based on a pair of paired images. That is, the 3D model generating process can be regarded as a process for generating a 3D model viewed from one camera position.

First, the controller 210 extracts candidates of feature points (Step S201). For example, the controller 210 detects a corner from the image A. In the corner detection, any point whose Harris corner feature or the like is not lower than a predetermined threshold but is the highest within a predetermined radius is selected as a corner point. Accordingly, points distinct from the other points, such as a front edge of a subject, are extracted as feature points.

When finishing the processing of Step S201, the controller 210 executes stereo matching to search the image B for points (corresponding points) corresponding to the feature points of the image A (Step S202). Specifically, using template matching, the controller 210 regards, as a corresponding point, any point whose similarity is not lower than a predetermined threshold but is the highest (or whose difference is not higher than a predetermined threshold but is the lowest). Various known techniques such as SAD (Sum of Absolute Differences), SSD (Sum of Squared Differences), NCC (Normalized Cross Correlation), ZNCC (Zero-mean Normalized Cross Correlation), orientation code correlation, etc. may be used as the template matching.

When finishing the processing of Step S202, the controller 210 calculates position information of the feature points from parallax information of the corresponding points found in Step S202, the field angles of the first image capturing unit 100A and the second image capturing unit 100B, the base length between the first image capturing unit 100A and the second image capturing unit 100B, etc. (Step S203). The calculated position information of the feature points is, for example, stored in the storage unit 250.

When finishing the processing of Step S203, the controller 210 executes Delaunay triangulation based on the position information of the feature points calculated in Step S203, and executes polygonization (Step S204). Polygon information generated thus is, for example, stored in the storage unit 250. When finishing the processing of Step S204, the controller 210 terminates the 3D model generating process.

With a small number of feature points, some shape information of the subject may be absent so that a true 3D model of the subject cannot be obtained. On the contrary, when the conditions with which candidates of feature points should be extracted or the conditions of stereo matching are relaxed to obtain more feature points, irrelevant points may be included in the candidates of feature points or wrong correspondence may be taken in the stereo matching. Thus, the position accuracy may be lowered, that is, the modeling accuracy may deteriorate. It is therefore necessary to extract an appropriate number of feature points to obtain a true 3D model of the subject while preventing the deterioration of the modeling accuracy.

In addition, a 3D model (3D information) is, for example, obtained from paired images using the following three expressions. The details of the method for obtaining 3D information from paired images have been, for example, disclosed in Non-Patent Document 1, Digital Image Processing, CG-ARTS Society, published on Mar. 1, 2006.

$$X=(b*u)/(u-u')$$

$$Y=(b*v)/(u-u')$$

$$Z=(b*f)/(u-u')$$

Here, b designates a distance between the optical devices 110A and 110B, which is referred to as "base length". (u, v) designates coordinates on an image of a subject taken by the optical device 110A, and (u', v') designates coordinates on an image of a subject taken by the optical device 110B. The difference (u−u') in the aforementioned three expressions designates a difference in coordinates of a subject 501 between two images of the same subject taken by the optical devices 110A and 110B respectively. The difference is referred to as "parallax". f designates a focal length of the optical device 110A. As described previously, the optical devices 110A and 110B have the same configuration, and have the same focal length f.

When finishing the 3D model generating process (Step S104), the controller 210 determines whether the shot number counter N is 1 or not (Step S105). Here, the fact that the shot number count N is 1 means that it is just after the first shot. When concluding that the shot number counter N is 1 (YES in Step S105), the controller 210 sets the 3D model generated in Step S104 as the combined 3D model (Step S106).

Figure 6:
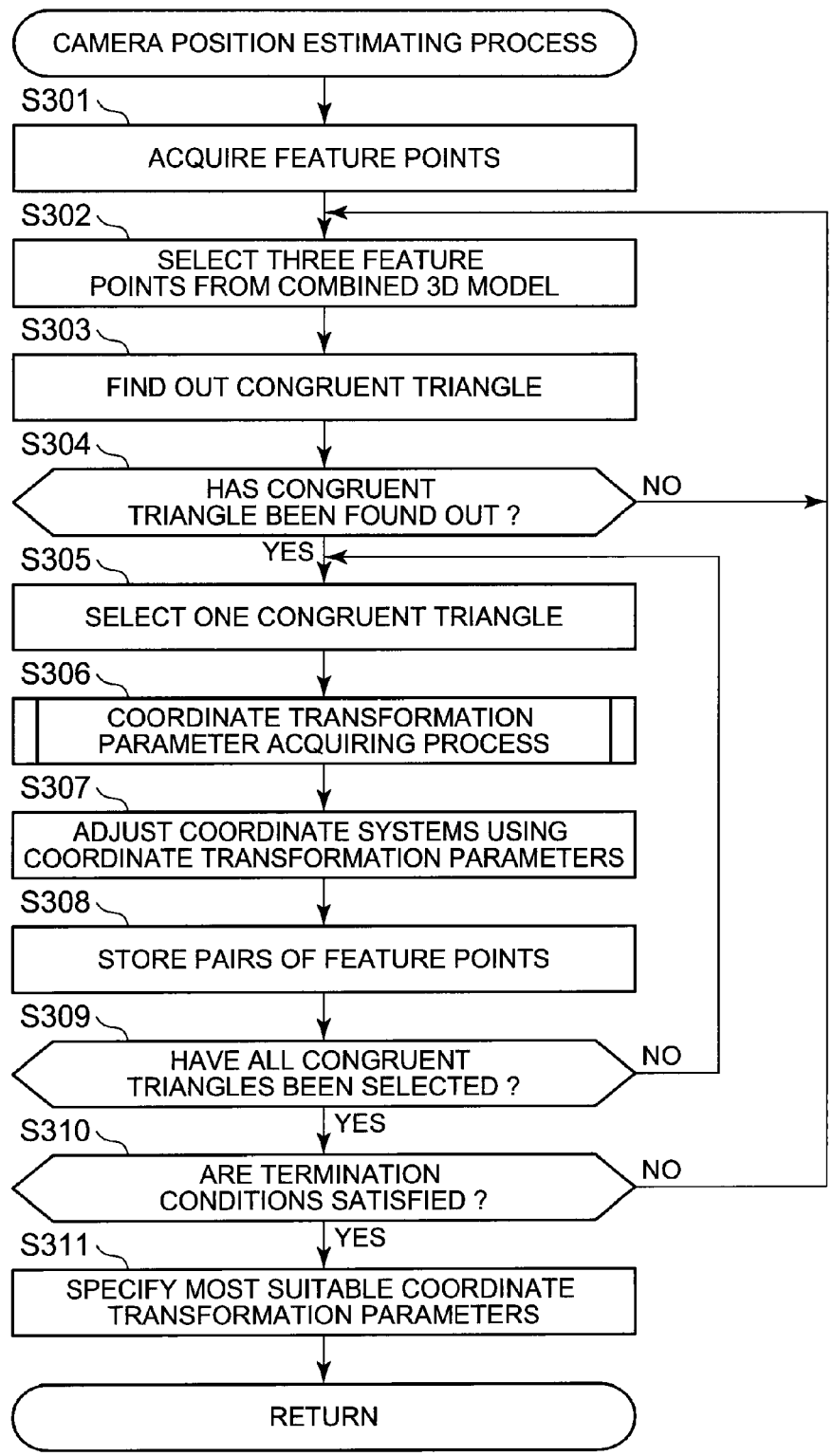
FIG. 6 is a flow chart showing a camera position estimating process shown in FIG. 4.

On the contrary, when the controller 210 concludes that the shot number counter N is not 1, that is, it is not just after the first shot (NO in Step S105), the controller 210 executes a camera position estimating process (Step S107). The camera position estimating process will be described with reference to the flow chart shown in FIG. 6. In the camera position estimating process, the relative position of the stereo camera 1000 in the current shot to the position of the stereo camera 1000 in the first shot is obtained. Obtaining the relative position is equivalent to obtaining coordinate transformation parameters with which the coordinates of a 3D model obtained in the current shot should be transformed into coordinates in the coordinate system of the 3D model obtained in the first shot.

First, the controller 210 acquires feature points on a 3D space from both the combined 3D model and the combining 3D model (Step S301). For example, the controller 210 selects, from feature points of the combined 3D model (or the combining 3D model), ones whose corner intensity is high and whose coincidence in stereo matching is high. Alternatively, the controller 210 may acquire feature points by executing matching based on SURF (Speeded-Up Robust Features) in consideration of epipolar constraint between paired images.

When finishing the processing of Step S301, the controller 210 selects three feature points from the combined 3D model (Step S302). Here, three feature points satisfying the following conditions (A) and (B) are selected. The condition (A) is that the area of a triangle using the three feature points as apexes of the triangle is not too small. The condition (B) is that the triangle using the three feature points as apexes of the triangle does not have an extremely acute angle. For example, the controller 210 selects three feature points at random repeatedly till three feature points satisfying the conditions (A) and (B) are selected.

When finishing the processing of Step S302, the controller 210 finds out, from triangles using three feature points belonging to the combining 3D model as three apexes thereof, a triangle congruent to the triangle using the three feature points selected in Step S302 as three apexes thereof (S303). For example, when lengths of three sides of one triangle are substantially equal to lengths of three sides of a second triangle, it is concluded that the two triangles are congruent. The processing of Step S303 can be also regarded as processing for finding out, from feature points of the combining 3D model, three feature points which can be regarded as corresponding to the three feature points selected from the combined 3D model in Step S302. The controller 210 may narrow the candidates of triangles in advance using color information in or around feature points, SURF features, etc. so as to speed up the search. Information expressing the found triangle (typically information expressing coordinates on a 3D space as to the three feature points forming the apexes of the triangle) is, for example, stored in the storage unit 250. When a plurality of congruent triangles are found out, information expressing all the triangles is stored in the storage unit 250.

When finishing the processing of Step S303, the controller 210 determines whether at least one congruent triangle has been found out in Step S303 or not (Step S304). When too many congruent triangles are found out, it may be concluded that no congruent triangle is found.

When concluding that at least one congruent triangle has been found out (YES in Step S304), the controller 210 selects one congruent triangle (Step S305). On the contrary, when the controller 210 concludes that no congruent triangle has not been found (NO in Step S304), the controller 210 returns to the processing of Step S302.

Figure 7:
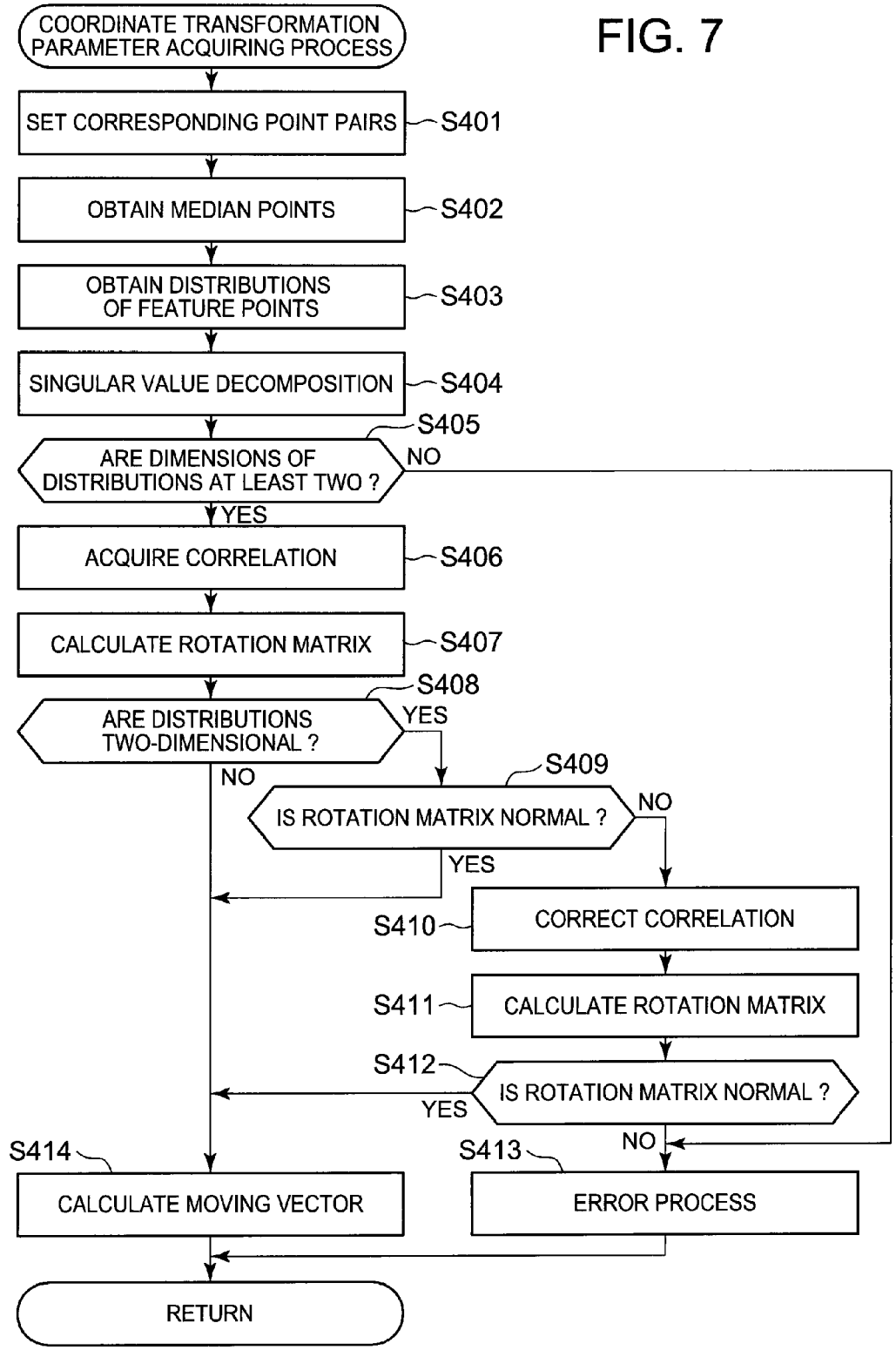
FIG. 7 is a flow chart showing a coordinate transformation parameter acquiring process shown in FIG. 6.

When finishing the processing of Step S305, the controller 210 executes a coordinate transformation parameter acquiring process (Step S306). The coordinate transformation parameter acquiring process will be described in detail with reference to the flow chart shown in FIG. 7. The coordinate transformation parameter acquiring process is a process for acquiring coordinate transformation parameters with which the coordinates of the combining 3D model should be transformed into coordinates in the coordinate system of the combined 3D model. The coordinate transformation parameter acquiring process is executed on each combination of the three feature points selected in Step S302 and the congruent triangle selected in Step S305. Here, in the coordinate transformation parameter acquiring process, a rotation matrix R and a moving vector t satisfying Expression (3) are obtained when pairs of corresponding points (paired feature points or paired apexes) are given by Expressions (1) and (2). In Expressions (1) and (2), p and p' have coordinates on a 3D space viewed from their own camera sight lines respectively. Incidentally, N designates the number of pairs of corresponding points.

$$p_i = \begin{bmatrix} x_i \\ y_i \\ z_i \end{bmatrix} (i = 1, 2, \ldots, N) \quad (1)$$

$$p'_i = \begin{bmatrix} x'_i \\ y'_i \\ z'_i \end{bmatrix} (i = 1, 2, \ldots, N) \quad (2)$$

$$p_i = R p'_i + t \quad (3)$$

First, the controller 210 sets pairs of corresponding points as shown in Expressions (4) and (5) (Step S401). Here, c1 and c2 are matrixes in which corresponding column vectors consist in coordinates of corresponding points. It is difficult to obtain the rotation matrix R and the moving vector t directly from these matrixes. However, the distribution of the points p is substantially equal to the distribution of the point p'. Therefore, if the median points of the corresponding points p and p' are aligned with each other, the points can be rotated relatively to each other so as to be superimposed on each other. By use of this, the rotation matrix R and the moving vector t are obtained.

$$c1 = [p_1\, p_2 \ldots p_N] \quad (4)$$

$$c2 = [p'_1\, p'_2 \ldots p'_N] \quad (5)$$

That is, the controller 210 obtains median points t1 and t2 as the median points of the feature points using Expressions (6) and (7) (Step S402).

$$t1 = \frac{1}{N} \sum_{i=1}^{N} p_i \quad (6)$$

$$t2 = \frac{1}{N} \sum_{i=1}^{N} p'_i \quad (7)$$

Next, the controller 210 obtains distributions d1 and d2 as the distributions of the feature points using Expressions (8) and (9) (Step S403). Here, as described above, there is a relationship of Expression (10) between the distribution d1 and the distribution d2.

$$d1 = [(p_1 - t1)\, (p_2 - t1) \ldots (p_N - t1)] \quad (8)$$

$$d2 = [(p'_1 - t2)\, (p'_2 - t2) \ldots (p'_N - t2)] \quad (9)$$

$$d1 = R d2 \quad (10)$$

Next, the controller 210 executes singular value decomposition on the distributions d1 and d2 using Expressions (11) and (12) (Step S404). Assume that singular values are arranged in descending order. Here, the sign * designates complex conjugate transpose.

$$d1 = U_1 S_1 V_1^* \quad (11)$$

$$d2 = U_2 S_2 V_2^* \quad (12)$$

Next, the controller 210 determines whether the distributions d1 and d2 are at least two-dimensional or not (Step S405). Singular values depend on how extensive the distribution is. Therefore, the determination is made using the ratio between the largest singular value and another singular value or the magnitude of each singular value. For example, the distribution is judged to be at least two-dimensional when the second largest singular value is not smaller than a predetermined value but the ratio of the second largest singular value to the largest singular value is within a predetermined range.

When concluding that the distributions d1 and d2 are not at least two-dimensional (NO in Step S405), the controller 210 cannot obtain the rotation matrix R but executes an error process (Step S413). Thus, the controller 210 terminates the coordinate transformation parameter acquiring process.

On the contrary, when concluding that the distributions d1 and d2 are at least two-dimensional (YES in Step S405), the controller 210 obtains a correlation K (Step S406). From Expressions (10) to (12), the rotation matrix R can be expressed as Expression (13). Here, when the correlation K is defined as Expression (14), the rotation matrix R can be expressed as Expression (15).

$$R = U_1 S_1 V_1^* V_2 S_2^{-1} U_2^* \quad (13)$$

$$K = S_1 V_1^* V_2 S_2^{-1} \quad (14)$$

$$R = U_1 K U_2^* \quad (15)$$

Here, eigenvectors U correspond to eigenvectors of the distributions d1 and d2, and are connected to each other by the correlation K. As an element of the correlation K, 1 or −1 is given when the eigenvectors correspond to each other, and 0 is given when the eigenvectors do not correspond. Since the distributions d1 and d2 are equal to each other, singular values are also equal to each other. That is, the values S in the distributions d1 and d2 are also equal to each other. In fact, the distributions d1 and d2 include errors. Therefore, the errors are rounded off. In consideration of the aforementioned description, the correlation K can be expressed as Expression (16). That is, the controller 210 calculates Expression (16) in Step S406.

$$K = \text{round}((\text{first to third rows of } V_1^*)(\text{first to third columns of } V_2)) \quad (16)$$

When finishing the processing of Step S406, the controller 210 calculates the rotation matrix R (Step S407). Specifically, the controller 210 calculates the rotation matrix R based on Expressions (15) and (16). Information expressing the rotation matrix R obtained by the calculation is, for example, stored in the storage unit 250.

When finishing the processing of Step S407, the controller 210 determines whether the distributions d1 and d2 are two-dimensional or not (Step S408). For example, when the smallest singular value is not larger than a predetermined value or the ratio of the smallest singular value to the largest singular value is without a predetermined range, the distributions d1 and d2 are determined as two-dimensional.

When concluding that the distributions d1 and d2 are not two-dimensional (NO in Step S408), the controller 210 calculates the moving vector t (Step S414). Here, the fact that the distributions d1 and d2 are not two-dimensional leads to the fact that the distributions d1 and d2 are three-dimensional. Here, p and p' satisfy the relationship of Expression (17). Expression (17) is modified to obtain Expression (18). Based on the correspondence between Expression (18) and Expression (3), the moving vector t can be expressed by Expression (19).

$$(p_i - t1) = R(p'_i - t2) \quad (17)$$

$$p_i = Rp'_i + (t1 - Rt2) \quad (18)$$

$$t = t1 - Rt2 \quad (19)$$

On the other hand, when the controller 210 concludes that the distributions d1 and d2 are two-dimensional (YES in Step S408), the controller 210 verifies the rotation matrix R and determines whether the rotation matrix R is normal or not (Step S409). When the distributions are two-dimensional, one of the singular values is zero. Accordingly, correlation between the distributions is indefinite as shown in Expression (14). That is, the element in the third row and the third column of the correlation K is either 1 or −1, but there is no guarantee of assignment of a proper sign in Expression (16). It is therefore necessary to verify the rotation matrix R. The verification is achieved by confirmation of outer product relationship of the rotation matrix R, arithmetic check with Expression (10), or the like. The confirmation of outer product relationship is to confirm whether column vectors (and row vectors) of the rotation matrix R satisfy restrictions on the coordinate system. In a right-handed coordinate system, the outer product of a vector in the first column and a vector in the second column is equal to a vector in the third vector.

When concluding that the rotation matrix R is normal (YES in Step S409), the controller 210 calculates the moving vector t (Step S414), and terminates the coordinate transformation parameter acquiring process.

On the contrary, when concluding that the rotation matrix R is not normal (NO in Step S409), the controller 210 corrects the correlation K (Step S410). Here, the sign of the element in the third row and the third column of the correlation K is reversed.

When finishing the processing of Step S410, the controller 210 calculates the rotation matrix R using the corrected correlation K (Step S411).

When finishing the processing of Step S411, the controller 210 determines again whether the rotation matrix R is normal or not, for the sake of confirmation (Step S412).

When concluding that the rotation matrix R is normal (YES in Step S412), the controller 210 calculates the moving vector t (Step S414). When finishing the processing of Step S414, the controller 210 terminates the coordinate transformation parameter acquiring process.

On the other hand, when concluding that the rotation matrix R is not normal (NO in Step S412), the controller 210 executes an error process (Step S413) and terminates the coordinate transformation parameter acquiring process.

When finishing the coordinate transformation parameter acquiring process (Step S306), the controller 210 adjusts the coordinate system using the acquired coordinate transformation parameters (Step S307). Specifically, the controller 210 transforms the coordinates of feature points in the combining 3D model into coordinates in the coordinate system of the combined 3D model using Expression (3).

When finishing the processing of Step S307, the controller 210 stores pairs of feature points (Step S308). Here, the pairs of feature points include feature points of the combined 3D model and, of feature points of the combining 3D model whose coordinates have been transformed, feature points whose distances from the feature points of the combined 3D model are not larger than a predetermined value and which are the closest to the feature points of the combined 3D model respectively. Here, it is estimated that the three feature points selected in Step S302 and the congruent triangle selected in Step S305 are more suitable with increase in the number of pairs of feature points. The pairs of feature points are stored in the storage unit 250 or the like, together with the coordinate transformation parameter acquiring conditions (selection of three features in Step S302 and selection of the congruent triangle in Step S305).

When finishing the processing of Step S308, the controller 210 determines whether all the congruent triangles found out in Step S303 have been selected in Step S305 or not (Step S309).

When concluding that there is a congruent triangle which has not yet been selected (NO in Step S309), the controller 210 returns to the processing of Step S305.

On the contrary, when concluding that all the congruent triangles have been selected (YES in Step S309), the controller 210 determines whether termination conditions are satisfied or not. In this embodiment, assume that the termination conditions relate to whether coordinate transformation parameters have been acquired in connection with at least a predetermined number of conditions.

When concluding that the termination conditions have not been satisfied (NO in Step S310), the controller 210 returns to the processing of Step S302.

On the contrary, when concluding that the termination conditions have been satisfied (YES in Step S310), the controller 210 specifies the most suitable coordinate transformation parameters (Step S311). Specifically, the controller 210 specifies coordinate transformation parameters with which the largest number of pairs of feature points can be acquired. In other words, the most suitable selection of three feature points in Step S302 and the most suitable selection of congruent triangles in Step S305 are specified. The coordinate transformation parameters include the rotation matrix R and the moving vector t.

When finishing the processing of Step S311, the controller 210 terminates the camera position estimating process.

When finishing the camera position estimating process (Step S107), the controller 210 executes a 3D model combining process (Step S108). The 3D model combining process will be described with reference to the flow chart of FIG. 8.

First, the controller 210 superimposes all the 3D models using the coordinate transformation parameters (Step S501). For example, in the case of the second shot, a combining 3D model generated based on paired images taken in the second shot and transformed in coordinates is superimposed on a combined 3D model generated based on paired images taken in the first shot. In the case of the third shot, the combining 3D model generated based on paired images taken in the second shot and transformed into coordinates is superimposed on the combined 3D model generated based on paired images taken in the first shot, and a combining 3D model generated based on paired images taken in the third shot and transformed into coordinates is further superimposed thereon.

When finishing the processing of Step S501, the controller 210 removes low-reliable feature points in view of the overlapping condition of feature points (Step S502). For example, select a remarkable feature point from feature points of a 3D model. The Mahalanobis distance of the remarkable feature point is calculated from the distribution of feature points closest thereto in other 3D models. When the Mahalanobis distance is not smaller than a predetermined value, the reliability of the remarkable feature point is determined to be low. Feature points whose distances from the remarkable feature point are not smaller than a predetermined value may be not included in the closest feature points. When the number of the closest feature points is small, the remarkable feature point may be regarded as low in reliability. Incidentally, assume that the processing for removing feature points actually is executed after determination has been made as to whether all the feature points should be removed or not.

When finishing the processing of Step S502, the controller 210 consolidates feature points which can be regarded as identical (Step S503). For example, all of feature points within a predetermined distance are dealt with as a group designating one and the same feature point, and the median point of the feature points is set as a new feature point.

When finishing the processing of Step S503, the controller 210 rearranges a polygon mesh (Step S504). That is, a polygon is created based on new feature points obtained in Step S503. When finishing the processing of Step S504, the controller 210 terminates the 3D model combining process.

Fundamentally, information (typically, information about coordinates of feature points) indicating 3D models generated in the 3D model generating process (Step S104) is not changed but held as to all the shots (all the sight lines) while the shutter button 331 is being pressed. That is, the 3D model combining process (Step S108) is a process in which a high-definition 3D model for display or storage is generated separately based on all the 3D models generated in the shots.

When finishing the processing of Step S108, the controller 210 increases the value of the shot number counter N by 1 (Step S109).

When finishing the processing of Step S106 or Step S109, the controller 210 displays the 3D model obtained by combination (Step S110). Specifically, the controller 210 displays, on the display unit 310, the 3D model obtained in the 3D model combining process (Step S108). Thus, a user can know what a proper 3D model has been generated in the current shot.

When finishing the processing of Step S110, the controller 210 determines whether the shutter button 331 has been released or not (Step S111). When concluding that the shutter button 331 has been released (YES in Step S111), the controller 210 stores the 3D model obtained by combination into the external storage unit 260 or the like (Step S112), and terminates the 3D modeling process. On the contrary, when concluding that the shutter button 331 has not been released (NO in Step S111), the controller 210 returns to the processing of Step S103.

With the stereo camera 1000 according to this embodiment, a plurality of 3D models are combined so that high-definition 3D modeling can be achieved while the absence of shape information is suppressed. In addition, with the stereo camera 1000 according to this embodiment, 3D modeling is performed with feature points from which feature points regarded as low in reliability are removed and in which feature points regarded as identical are consolidated. Accordingly, suitable 3D modeling can be performed. Further, the stereo camera 1000 according to this embodiment does not have such a configuration that images of a subject are taken from various angles concurrently. Therefore, the stereo camera 1000 according to the embodiment can be miniaturized. In addition, a user can view a polygon displayed on the display unit 310 so that the user can know what a proper 3D model has been generated. Thus, the user can determine whether a satisfactory 3D model has been obtained or from which angle the subject should be imaged for satisfactory 3D modeling.

(Modifications)

The invention is not limited to the aforementioned embodiment.

In the aforementioned embodiment, it is assumed in Step S310 that the termination conditions relate to whether coordinate transformation parameters have been acquired in connection with at least a predetermined number of conditions, by way of example. However, the termination conditions are not limited to that example. For example, the termination conditions may be set as whether coordinate transformation parameters with which the number of pairs of feature points is not smaller than a predetermined number have been obtained.

In the aforementioned embodiment, the coordinate transformation parameters with which the largest number of pairs of feature points have been obtained are specified in Step S311 by way of example. However, the coordinate transformation parameters with which the average of distances between pairs of feature points is the smallest may be specified.

In the aforementioned embodiment, the coordinates of a combining 3D model are transformed into coordinates in the coordinate system of a combined 3D model by way of example. However, the coordinates of the combined 3D model may be transformed into coordinates in the coordinate system of the combining 3D model.

In the aforementioned embodiment, three feature points are selected from the combined 3D model, and three feature points corresponding to the three selected feature points are selected from the combining 3D model, by way of example. However, three feature points may be selected from the combining 3D model, and three feature points corresponding to the three selected feature points may be selected from the combined 3D model.

The invention is also applicable to an apparatus (such as a personal computer) having no imaging device. In this case, 3D models are combined based on a plurality of pairs of images prepared in advance. Of the pairs of images, a pair of images where a subject looks best may be assigned as a reference pair of images (key frame).

The 3D modeling apparatus according to the invention may be implemented with a normal computer system without using any dedicated system. For example, a program for executing the aforementioned operations may be stored and distributed in the form of a computer-readable recording medium such as a flexible disk, a CD-ROM (Compact Disk Read-Only Memory), a DVD (Digital Versatile Disk) or an MO (Magneto Optical Disk), and installed in a computer system, so as to arrange a 3D modeling apparatus for executing the aforementioned processes.

Further, the program stored in a disk unit or the like belonging to a server apparatus on the Internet may be, for example, superposed on a carrier wave so as to be downloaded into a computer or the like.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A 3D modeling apparatus comprising:
an accepting unit configured to accept a plurality of pairs of images that are obtained by capturing an image of a subject multiple times at different angles using a stereo camera that is configured to obtain a pair of images in a single shooting;
a generator configured to generate a plurality of 3D models of the subject based on the accepted pairs of images, wherein each of the 3D models corresponds to one of the pairs of images;
a selector configured to select a first 3D model and a second 3D model from the plurality of 3D models;
an extracting unit configured to extract a plurality of first feature points from the first 3D model and extract a plurality of second feature points from the second 3D model;
an acquiring unit configured to (i) select three first feature points from the plurality of first feature points, (ii) select three second feature points from the plurality of second feature points, such that a triangle whose three vertices correspond to the three first feature points is congruent to a triangle whose three vertices correspond to the three second feature points, and acquire coordinate transformation parameters such that positions of the three second feature points coincide with positions of the three first feature points;
a transformation unit configured to transform coordinates of the second 3D model into coordinates in a coordinate system of the first 3D model, based on the acquired coordinate transformation parameters; and
a combining unit configured to combine the second 3D model having the transformed coordinates on the first 3D model.

2. The apparatus of claim 1, wherein the acquiring unit is configured to:
repeatedly select three first feature points from the first feature points at random to acquire the plurality of coordinate transformation parameters; and
select one coordinate transformation parameter from the plurality of coordinate transformation parameters.

3. The apparatus of claim 2, wherein the acquiring unit is configured to select said one coordinate transformation parameter from the plurality of coordinate transformation parameters, such that the transformed positions of the second feature points are closest to the positions of the first feature points.

4. The apparatus of claim 1, wherein:
the selector is configured to select all 3D models other than the first 3D model, as second 3D models;
the acquiring unit is configured to acquire the coordinate transformation parameters for each of the selected 3D models other than the first 3D model;
the transformation unit is configured to transform the coordinates of each of the selected 3D models other than the first 3D model into coordinates in the coordinate system of the first 3D model, and
the combining unit is configured to combine each of the second 3D models having the transformed coordinates on the first 3D model.

5. The apparatus of claim 4, wherein the combining unit is configured to:
group the first feature points and the second feature points into a plurality of groups such that the first and second feature points corresponding to each other belong to the same group; and
obtain median points of the plurality of groups and set the median points as new feature points to generate a new 3D model.

6. A 3D modeling method, comprising:
accepting a plurality of pairs of images that are obtained by capturing an image of a subject multiple times at different angles using a stereo camera that is configured to obtain a pair of images in a single shooting;
generating a plurality of 3D models of the subject based on the accepted pairs of images, wherein each of the 3D models corresponds to one of the pairs of images;
selecting a first 3D model and a second 3D model from the plurality of 3D models;

extracting a plurality of first feature points from the first 3D model and extracting a plurality of second feature points from the second 3D model;

selecting three first feature points from the plurality of first feature points;

selecting three second feature points from the plurality of second feature points, such that a triangle whose three vertices correspond to the three first feature points is congruent to a triangle whose three vertices correspond to the three second feature points;

acquiring coordinate transformation parameters such that positions of the three second feature points coincide with positions of the first three feature points;

transforming coordinates of the second 3D model into coordinates in a coordinate system of the first 3D model, based on the acquired coordinate transformation parameters; and combining the second 3D model having the transformed coordinates on the first 3D model.

7. A non-transitory computer-readable medium storing a program for causing a computer to perform operations comprising:

accepting a plurality of pairs of images that are obtained by capturing an image of a subject multiple times at different angles using a stereo camera that is configured to obtain a pair of images in a single shooting;

generating a plurality of 3D models of the subject based on the accepted pairs of images, wherein each of the 3D models corresponds to one of the pairs of images;

selecting a first 3D model and a second 3D model from the plurality of 3D models;

extracting a plurality of first feature points from the first 3D model and extracting a plurality of second feature points from the second 3D model;

selecting three first feature points from the plurality of first feature points;

selecting three second feature points from the plurality of second feature points, such that a triangle whose three vertices correspond to the three first feature points is congruent to a triangle whose three vertices correspond to the three second feature points;

acquiring coordinate transformation parameters such that positions of the three second feature points coincide with positions of the first three feature points;

transforming coordinates of the second 3D model into coordinates in a coordinate system of the first 3D model, based on the acquired coordinate transformation parameters; and combining the second 3D model having the transformed coordinates on the first 3D model.

* * * * *